(12) United States Patent
Sauder et al.

(10) Patent No.: US 9,145,338 B2
(45) Date of Patent: Sep. 29, 2015

(54) METHOD FOR PRODUCING A COMPOSITE INCLUDING A CERAMIC MATRIX

(75) Inventors: Cédric Sauder, Saint Arnoult en Yvelines (FR); Christophe Lorrette, Villenave D'Ornon (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 198 days.

(21) Appl. No.: 14/003,791

(22) PCT Filed: Jan. 23, 2012

(86) PCT No.: PCT/EP2012/050979
§ 371 (c)(1),
(2), (4) Date: Dec. 11, 2013

(87) PCT Pub. No.: WO2012/119805
PCT Pub. Date: Sep. 13, 2012

(65) Prior Publication Data
US 2014/0084521 A1   Mar. 27, 2014

(30) Foreign Application Priority Data
Mar. 7, 2011   (FR) ...................................... 11 51825

(51) Int. Cl.
*C04B 35/565*   (2006.01)
*B28B 7/34*   (2006.01)
(Continued)

(52) U.S. Cl.
CPC ............... *C04B 35/565* (2013.01); *B28B 7/342* (2013.01); *B28B 23/0006* (2013.01);
(Continued)

(58) Field of Classification Search
CPC ............................ C04B 35/565; C04B 35/806
USPC ................................................. 264/682, 640
See application file for complete search history.

(56) References Cited

U.S. PATENT DOCUMENTS

| | | | | |
|---|---|---|---|---|
| 5,382,453 A | * | 1/1995 | Mason | 427/249.2 |
| 5,490,892 A | * | 2/1996 | Castagnos et al. | 156/89.26 |
| 5,552,351 A | * | 9/1996 | Anderson et al. | 501/81 |
| 6,368,663 B1 | * | 4/2002 | Nakamura et al. | 427/248.1 |
| 7,311,790 B2 | * | 12/2007 | Morrison et al. | 156/89.11 |
| 7,704,274 B2 | * | 4/2010 | Boyle et al. | 623/1.13 |

(Continued)

FOREIGN PATENT DOCUMENTS

EP   0 611 741 A1   8/1994

OTHER PUBLICATIONS

International Search Report in Application No. PCT/EP2012/050979, European Patent Office, Rijswijk, NL, dated Apr. 24, 2012.
(Continued)

*Primary Examiner* — Joseph S Del Sole
*Assistant Examiner* — Russell Kemmerle, III
(74) *Attorney, Agent, or Firm* — Nixon Peabody LLP

(57) ABSTRACT

A method for producing a part made of ceramic matrix and ceramic fibers composite material. It comprises: the formation of a fibrous preform by intertwining threads constituted of ceramic material fibers on a contact surface of a support element reproducing the internal and/or external shape of the part to be produced; the partial densification of the fibrous preform at a temperature below the melting temperature of the material of the support element and below the melting temperature of the material of the fibers of the preform, said partial densification resulting in a consolidated fibrous preform comprising a matrix volume fraction above 5% and at the most equal to 40% of the matrix volume of the part to be produced; the removal of the support element from the consolidated fibrous preform by chemical attack of the contact surface of the material of the support element; the densification of the consolidated preform, carried out at a temperature below the melting temperature of the fibers of said preform.

16 Claims, 3 Drawing Sheets

(51) Int. Cl.
  *B28B 23/00* (2006.01)
  *C04B 35/80* (2006.01)
  *C04B 35/83* (2006.01)
  *G21C 3/07* (2006.01)
  *G21C 21/02* (2006.01)

(52) U.S. Cl.
  CPC .............. *C04B 35/806* (2013.01); *C04B 35/83* (2013.01); *C04B 2235/5244* (2013.01); *C04B 2235/5248* (2013.01); *C04B 2235/5252* (2013.01); *C04B 2235/6028* (2013.01); *C04B 2235/614* (2013.01); *C04B 2235/616* (2013.01); *G21C 3/07* (2013.01); *G21C 21/02* (2013.01)

(56) References Cited

U.S. PATENT DOCUMENTS

| | | | |
|---|---|---|---|
| 8,533,949 B2* | 9/2013 | Bunker | 29/889.721 |
| 2013/0034655 A1 | 2/2013 | Lorrette et al. | |
| 2014/0153688 A1 | 6/2014 | Zabiego et al. | |

OTHER PUBLICATIONS

International Preliminary Report on Patentability and Written Opinion in Application No. PCT/EP2012/050979, International Bureau, Geneva, CH, dated Sep. 10, 2013.
U.S. Appl. No. 14/367,397, filed Jun. 20, 2014.

* cited by examiner

METHOD FOR PRODUCING A COMPOSITE INCLUDING A CERAMIC MATRIX

CROSS REFERENCE TO RELATED APPLICATIONS OR PRIORITY CLAIM

This application is a National Phase of PCT/EP2012/050979, filed Jan. 23, 2012, entitled, "Method For Producing A Composite Including A Ceramic Matrix", which claims the benefit of French Patent Application No. 11 51825, filed Mar. 7, 2011, the contents of which are incorporated herein by reference in their entirety.

TECHNICAL FIELD

The present invention relates to the manufacture of parts made of reinforced composite materials.

In particular, the invention relates to a method for manufacturing a part made of ceramic matrix composite material.

PRIOR ART

Parts made of ceramic matrix composite materials (also known as CMC materials) are characterised by remarkable mechanical properties, particularly in terms of hardness, tenacity, wear resistance and resistance to mechanical and thermal shocks.

Due to these particular properties, parts made of ceramic matrix composite materials are particularly appreciated and used, or even envisaged, in numerous application fields, such as for example in aeronautics (discs of brakes, parts of structures of reactors operating at high temperature, etc.), in gas turbines (parts of structures operating at high temperature), in the nuclear sector (cladding material for SFR reactors (in other words, sodium cooled fast neutron reactors), for GFR reactors (in other words gas cooled fast reactors), or instead for PWR reactors (in other words pressurised water reactors); material for making control rods, etc.).

Parts made of ceramic matrix composite materials are constituted of a matrix made of ceramic material and fibres which are themselves also made of ceramic material; usually, the fibres are made of carbon or silicon carbide. The fibres enable the good mechanical strength of the part, whereas the matrix, which is the material present between the fibres, has the function of bonding the fibres together and confers its cohesion to the part.

The first step for the manufacture of a part made of ceramic matrix composite material consists in producing a porous fibrous preform from threads of continuous or discontinuous ceramic fibres (for example fibres made of silicon carbide or carbon). Each of the threads used may comprise up to several hundred fibres, or even several thousand or tens of thousands of fibres.

The preform obtained at the end of this first step is commonly called a dry preform; it has a great flexibility and a high porosity.

The fibrous preform is a fibre reinforcement, of the shape and with the dimensions of the part to be produced. This preform (and, consequently, the part to be produced) may have all sorts of shapes.

For example, within the scope of the production of objects/parts of plate type, the technique of weaving is commonly used to produce the preform. A preform 1 as represented in FIG. 1a is then obtained, where the threads 2 are intertwined.

To produce tubes, it is possible for example to use the technique of braiding or instead the technique of filament winding, which are perfectly adapted to objects having an axis of revolution. A preform 1 as represented in FIG. 1b is then obtained.

In order to make the final part rigid and to give it interesting mechanical characteristics, it is necessary to then carry out a step known as densification, which is going to consist in filling the porosity of the dry preform by one or more dense ceramic phases (carbon, silicon carbide, etc.) and forming the matrix of the composite.

This densification step may be carried out by different techniques, the most known of which are CVI (Chemical Vapour Infiltration) and PIP (Polymer Infiltration and Pyrolysis).

Whatever the technique used to carry out the densification, it is necessary to use toolings that serve as support elements to the preform, in order to control the mechanical characteristics and the final geometry of the composite parts that it is wished to obtain. It is necessary that these toolings are chemically compatible with the fibrous preform and the products used (gases and/or liquid) at the high temperatures required by these methods (around 1000° C., or even above).

As an example, for the manufacture of parts or objects of plate type, the dry preform is maintained in a controlled manner between two graphite plates (pierced with regularly spaced holes to make the preform accessible to the precursor gas or liquids) that will be removed later.

Within the scope of the manufacture of a part with axis of revolution, for example a tube, the braiding or any other suitable shaping technique of the dry preform is carried out on a graphite mandrel.

The tooling used is typically made of graphite because, in addition to being of modest cost, graphite has excellent compatibility with most ceramic fibrous reinforcements (carbon, silicon carbide, etc.) at the high temperatures required by the densification methods.

However, graphite also has several drawbacks.

One of the drawbacks of graphite is its low rigidity (modulus of elasticity E comprised between 20 and 30 Gpa), which makes it difficult to use to form parts of long lengths but of small diameters such as tubes. This is why, during operations of braiding or other technique of implementing threads requiring a mandrel as support element, it is wished to avoid the use of graphite mandrels.

Furthermore, graphite is friable, which makes it difficult to respect the dimensions and the tolerances of parts over long lengths.

Finally, graphite has the drawback of being particularly delicate to remove after the densification step(s) of the fibrous reinforcement conventionally used (CVI, PIP, etc.).

In fact, after the densification step(s), the graphite remains, most of the time, strongly bonded to the ceramic composite material thereby formed. It is then necessary to eliminate the graphite tooling by resorting to a controlled oxidation of the graphite between 400 and 500° C.

Yet this oxidation is a long step, costly and which can lead to a degradation of the composite material. Moreover, oxidation generally does not make it possible to obtain a total elimination of the tooling.

It is advisable to employ machining techniques to obtain the complete elimination of the tooling; however, these machining techniques may lead to an alteration of the composite, without nevertheless assuring a respect of the dimensions and strict tolerances on the surface of the part in contact with the tooling (interface).

It will thus be understood that the use of graphite toolings may be suitable for the manufacture of parts for which the guarantee of mechanical characteristics and the respect of the geometric shape of the surface of the part in contact with the tooling (such as for example the internal surface of parts with axis of revolution) are not primordial; this cannot however be envisaged for the manufacture of parts for which strong constraints on these parameters are required.

The Inventors have thus set themselves the aim of conceiving a manufacturing method which does not have the drawbacks of the prior art.

More precisely, the Inventors have sought to conceive a manufacturing method which makes it possible to improve the quality of the composite parts formed, namely a method that makes it possible to conserve the mechanical characteristics and/or to respect the dimensions, the tolerances and/or the roughness of the surface of the parts made of ceramic matrix composite (CMC) materials thereby formed.

DESCRIPTION OF THE INVENTION

This aim is attained thanks to a method for producing a part made of ceramic material matrix and ceramic material fibres composite material, the method comprising the following successive steps:

formation of a fibrous preform by intertwining threads constituted of ceramic material fibres on a contact surface of a support element reproducing the internal and/or external shape of the part to be produced;

partial densification of the fibrous preform at a temperature below the melting temperature of the material of the support element and below the melting temperature of the material of the fibres of the preform, said partial densification resulting in a consolidated fibrous preform comprising a matrix volume fraction above 5% and at the most equal to 40% of the matrix volume of the part to be produced;

removal of the support element from the consolidated fibrous preform by chemical attack of the contact surface of the material of the support element;

densification of the consolidated preform, carried out at a temperature below the melting temperature of the fibres of said preform.

It should be noted that densification, in the manufacture of a reinforced composite material such as a ceramic matrix composite material, is a step well known to those skilled in the art, which consists in filling the porosity of the fibrous preform with the matrix.

The densification may for example consist in a CVI densification, in other words in an infiltration of a precursor gas of the ceramic matrix into the fibrous preform, carried out in an oven at high temperature; by sending the precursor gas at high temperature (generally comprised between 900 and 1000° C. or above) onto the preform, the precursor gas decomposes and produces carbon or ceramic compounds (silicon carbide or other carbides) that fill the porosity of the fibrous preform.

The densification can also be a PIP densification, in other words an impregnation of a solution of a precursor polymer of the ceramic matrix of the part to be produced, followed by a pyrolysis of the precursor polymer at high temperature.

In the method according to the invention, the densification takes place in two steps, separated by a step of removal of the support element on which is formed the fibrous preform.

More precisely, in the method of the invention, a porous fibrous preform having the shape and the dimensions of the part to be manufactured is firstly formed by intertwining threads on a support element; this intertwining of threads may consist in a weaving, in a braiding of the threads or any other known technique of intertwining threads.

The preform is then subjected to a partial densification in order to consolidate it mechanically.

Then, the support element is removed by carrying out its total or partial destruction and the densification of the preform is completed, the densification then no longer being limited by the melting temperature of the material of the support element.

The step of removal of the support element from the consolidated fibrous preform may thus result from a partial destruction of the support element by chemical attack, namely a chemical attack of at least the contact surface of the material of the support element, which enables the removal of the partly destroyed support element from the consolidated fibrous preform. The partial destruction is in fact a partial consumption or dissolution of the support element.

This step of removal may also consist in a total destruction of the support element; in this case, the chemical attack takes place on the whole of the support element. Here again the destruction is in fact a consumption, or more precisely a dissolution, of the support element.

In fact, a total destruction is not always indispensable, particularly in the case where the fibrous preform surrounds the support element and that it is sufficient to reduce the external diameter of the latter to obtain the removal. A surface dissolution is then sufficient so that the support element and the fibrous preform can be dissociated.

On the other hand, in the case where the preform is closed, for example when the preform has a sphere shape woven onto a support element itself having the shape of a sphere, it is then necessary to completely destroy the support element so that it can be removed.

Preferably, the fibrous preform consolidated at the partial densification step comprises a matrix volume fraction at the most equal to 30% of the matrix volume of the part to be produced. Preferentially, the fibrous preform consolidated at the partial densification step comprises a matrix volume fraction at the most equal to 20%, preferably at the most equal to 10%, of the matrix volume of the part to be produced.

By removing the support element before the infiltrated matrix volume fraction is greater than or equal to 40%, preferably below 30%, preferentially below 20 and preferably at the most equal to 10%, it makes it possible to limit placing under mechanical stress the matrix, which has poor tensile characteristics ($\sigma_{Rm}$~100 Mpa for SiC) compared to the fibrous preform, more able to withstand high tensile stresses ($\sigma_{Rf}$~2000 Mpa for SiC). Thus, the lower the matrix volume fraction, the more the residual stresses will be taken up by the fibrous preform, which limits the loading of the matrix and, consequently, the fissuring of the composite material. Obviously, it is necessary however that the fibrous preform is consolidated before removing the support element, in other words that the matrix volume fraction is sufficient so that once the support element is removed, the consolidated fibrous preform has sufficient rigidity so that it can maintain its geometric characteristics and be handled easily.

According to a preferred arrangement of the invention, the support element is made of silica, in other words silicon dioxide. It is proposed to use preferentially silica glass, which is the amorphous form of silica, quartz being its crystalline form, because silica glass has in particular a lower cost than quartz. It should be noted that silica glass ($SiO_2$) is sometimes called, wrongly, quartz in the interest of simplification.

According to a possible variant of the invention, instead of being exclusively made of silica, the support element is made of a material based on silica; the support element must nevertheless comprise at least 80% by weight of silica. It may for example be a cement obtained by mixing a 95% by weight, preferably a 99% by weight, silica powder with an aqueous binder.

According to a second preferred arrangement of the invention, the support element is made of alumina ($Al_2O_3$).

According to a possible variant of the invention, the support element may be made of a material based on alumina, providing that said material contains at least 80% by weight of alumina. It may for example be a cement obtained by mixing a 95% by weight, preferably a 99% by weight, alumina powder with an aqueous binder.

According to a third preferred arrangement of the invention, the support element is made of zirconium oxide.

According to a possible variant of the invention, the support element may be made of a material based on zirconium oxide, providing that said material contains at least 80% by weight of zirconium oxide, for example a cement obtained by mixing a 95% by weight, preferably a 99% by weight, zirconium oxide powder with an aqueous binder.

According to a fourth preferred arrangement of the invention, the support element comprises a core that is made of a metal able to withstand the densification temperature of the preform, preferably a metal that withstands a temperature of 1000° C., and which is covered with a layer of silica, silica glass, alumina or zirconium oxide. When it is said that the metal has to withstand temperature, this means that it must maintain its geometric shape; in other words, it must not melt or become superplastic.

As regards the chemical attack of the support element, whether it is made of silica glass, alumina or zirconium oxide, it is advantageously obtained using an acid, preferably hydrofluoric acid, or a base, namely a concentrated basic solution (for example caustic soda NaOH).

It is understood that the agent used to carry out the chemical attack is chosen so that only the support element is consumed: it is a selective chemical attack. Hydrofluoric acid is a good example, since this acid attacks silica glass, alumina and zirconium oxide, without attacking carbon, silicon carbide and other ceramics that may be used.

It is pointed out that in the particular case of the fourth preferred arrangement of the invention, the support element is not entirely consumed; in fact, it is the coating present on the metal core that is consumed by the chemical attack. Thus, when the support element comprises a metal core which is covered with a layer made of silica glass, alumina or zirconium oxide, the chemical attack of the support element is advantageously obtained by carrying out the chemical attack of the layer of silica, silica glass, alumina or zirconium oxide present on the core using an acid, preferably hydrofluoric acid, or a base.

Advantageously, the support element, instead of being a solid element, is a hollow element.

Advantageously, the support element has an axis of revolution (it may for example be an element having a cylindrical shape) or is of flat shape. It may for example be a tubular mandrel or a plate.

Advantageously, the fibres are made of a material selected from carbon and silicon carbide.

Advantageously, the matrix is made of a material selected from carbon and silicon carbide.

The production method according to the invention can enable numerous parts of different shapes to be produced. As an example, the part made of composite material may be a composite material cladding for a GFR (gas fast reactor), for a SFR (sodium fast reactor) or instead for a pressurised water reactor. The part may also be a hexagonal composite material tube, for example for a SFR reactor, a pressurised water reactor or a GFR reactor.

The production method according to the invention has numerous advantages.

It makes it possible to obtain parts made of composite material having more precise dimensions and error tolerances than in the case of the use of a graphite support element and does so whatever the size of the parts implemented.

The method according to the invention also makes it possible to limit the manufacturing costs of parts made of composite material, since it is no longer necessary to have to resort to a machining of the support element and that it is possible to use, for the support element, a material that is relatively cheap, such as silica glass.

Finally, since the support element is removed without having need to resort to an oxidation and/or to a machining as in the case of graphite, which could damage the surface of the part made of composite material, the mechanical characteristics and the dimensions of the part made of composite material are conserved.

The potential applications of the method according to the invention concern all parts made of composite material formed of a ceramic material matrix for which the respect of the tolerances of dimensions and purity is important. The manufacture of ceramic fuel claddings for fourth generation GFR or SFR reactors may in particular be cited.

The invention will be better understood and other advantages and particularities will become clear on reading the description that follows, given as non-limiting example, accompanied by the appended FIGS. 1 to 3.

DETAILED DESCRIPTION OF PARTICULAR EMBODIMENTS

Figure 1A:
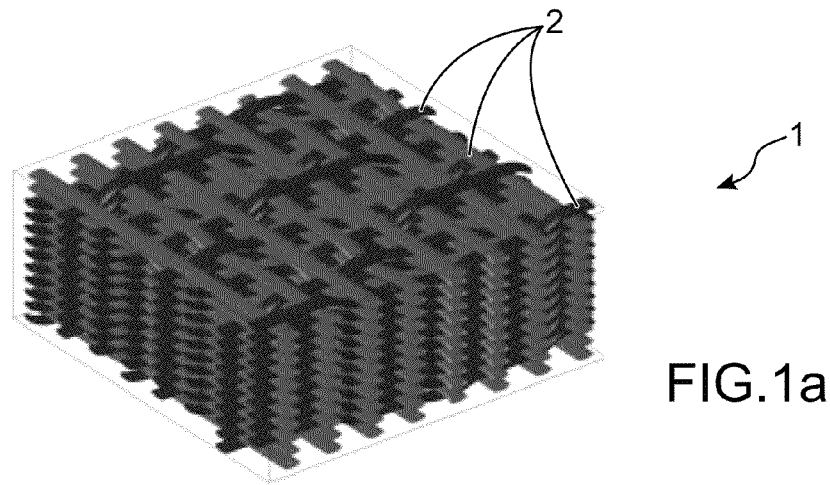
FIGS. 1a and 1b represent respectively a three dimensional view of a fibrous preform 1 of flat shape obtained by "2.5D interlock" weaving of threads 2 and a three dimensional view of a tubular shape of a fibrous preform 1 obtained by 2D braiding (in other words in two dimensions) of threads 2. It is pointed out that the fibres composing each of the threads 2 are not represented.
Figure 1B:
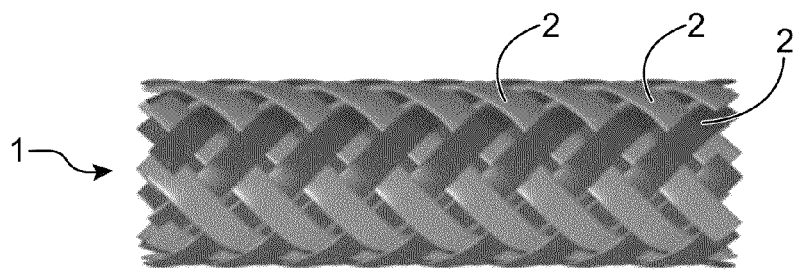

The Inventors propose producing a part made of ceramic matrix composite material by replacing the material of the support element, normally made of graphite, by a silica glass material, and carrying out the densification of the fibrous preform in two steps.

The table below compares the main characteristics of silica glasses with different commercially available isotropic graphites. For information purposes, the main characteristics of alumina and zirconium oxide are also indicated which, like silica glass, may be used, within the scope of the present invention, to form the support element.

For certain characteristics, the given ranges correspond either to a variability of the measured characteristic, or to differences specific to slight commercial variants.

In consulting this table, it may be noted that silica glass has numerous advantages.

Firstly, in addition to being of reasonable cost, it has better rigidity than graphite.

Silica glass also has the advantage of having low adhesion with the ceramic matrices of carbon and silicon carbide type, which facilitates the removal of the support element.

| Characteristics | Silica glass | Graphite | Alumina | zirconium oxide |
|---|---|---|---|---|
| Density | 2.2 | 1.7-2 | 3.9 | 5.9 |
| Hardness (Mohs) | 5.5-6.5 | 1-2 | 9.2 | 7.5 |
| Tensile breaking stress (MPa) | 50 | 40-80 | ~200 | ~200 |
| Compressive breaking stress (MPa) | >1000 | >150 | 2200-2600 | ~2000 |
| Modulus of elasticity (GPa) | 70-90 | 20-30 | 300-400 | ~220 |
| Coefficient of expansion ($10^{-6}$ °C.$^{-1}$) | 0.55 | 3-6 | ~8 | ~10 |
| Thermal conductivity (W/m/K) | 1.4 | 80-130 | 26-35 | ~2 |
| Maximum temperature of use under inert atmosphere (° C.) | 1100 | >2000 | ~1700 | ~2000 |
| Maximum temperature of use under air (° C.) | 1100 | ~400 | ~1700 | ~2000 |

Moreover, its thermo-mechanical stability and its chemical compatibility are perfect with carbon, silicon carbide and numerous other ceramics up to around 1100° C. It should be pointed out that this temperature must not be exceeded during the method of partial densification used to consolidate the fibrous preform. In fact, above 1100° C., silica glass loses its mechanical properties.

To form a part made of composite material, one begins by carrying out the shaping of a fibrous preform on a silica glass element through the intertwining of threads. The intertwining of the threads may consist in a weaving, a braiding or any other known technique of intertwining threads.

Once the preform is obtained, it is necessary to consolidate it before removing the support element.

To do this, the partial densification of the fibrous preform is carried out by CVI, PIP or any other densification technique, the implementation temperature of which is below 1100° C. (melting temperature of the silica glass). The consolidated part obtained is a composite part having a low matrix volume fraction. This volume fraction is at the most equal to 40%; preferably, it is at the most equal to 30%.

Although for graphite the support element may be used until the final composite is obtained, it is primordial, in the case of the use of a silica glass support element, to remove the support element before the matrix volume fraction is too high. Otherwise, an important fissuring of the composite could be generated, or even its total rupture at the end of the method.

In fact, the drawback of silica glass for use in methods implemented at high temperature is the difference between the coefficients of expansion of this material and the ceramics elaborated (carbon, silicon carbide, etc.). Thus, while cooling to ambient temperature at the end of the method, this difference between the coefficients of expansion generates residual stresses within the materials (support element and part made of composite material) which may be important (going up to several hundred MPa) and lead to fissuring of the support element, or even, more seriously, of the part made of composite material.

This is all the more true in the presence of residual tensile stresses on the ceramic materials.

In order to limit the residual stresses, it is preferable to use a hollow support element, rather than a solid support element. In fact, by limiting the quantity of material of the support element, in so doing the stresses are limited. It is for example preferable to use a mandrel of tubular type for the manufacture of parts of tubular shape, even if the use of a solid mandrel remains possible.

To illustrate this conclusion, calculations were performed by taking as example the formation of a composite cladding for GFR reactors, namely a tubular composite part made of SiC/SiC composite having an internal diameter of 8 mm and an external diameter of 10 mm.

These calculations were performed taking into account the use of threads constituted of latest generation silicon carbide fibres compatible with a nuclear environment, namely Hi-Nicalon S™ or SA3™ type fibres and in considering that the support element is a mandrel (element of cylindrical shape).

Three types of mandrels have been considered: the first is a graphite rod, the second is a silica glass rod and the final one is a silica glass tube, each of these mandrels having an external diameter of 8 mm.

The fibrous preform is formed on each mandrel according to a 2D braiding, then its complete densification is carried out, without removing the support element. The densification is here, in our example, a conventional CVI densification and is taken to a temperature situated between 900 and 1000° C. (in other words in the temperature range conventionally used to carry out densification).

After a return to ambient temperature, the calculation of the residual stresses within the two materials (mandrel and composite) is then simulated using an analytical model supplied with the thermo-mechanical properties of each material used.

Figure 2A:
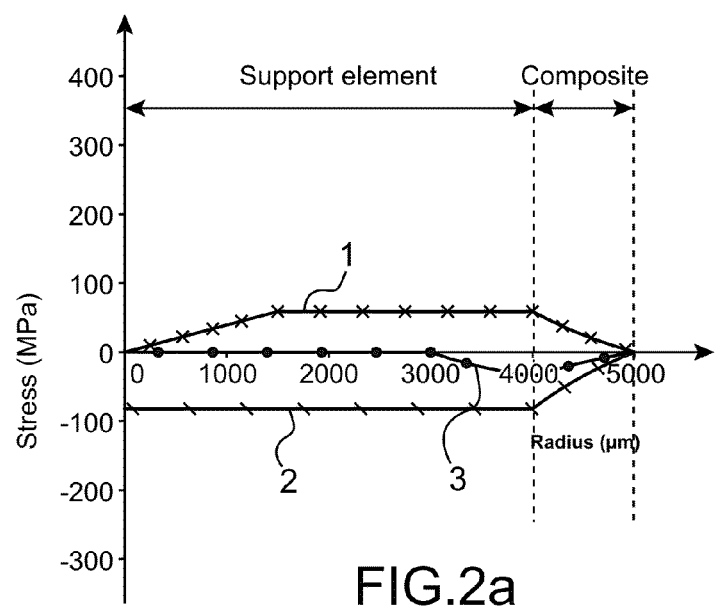
FIGS. 2a, 2b and 2c illustrate respectively the effect of the composition of the support element on the residual radial (FIG. 2a), circumferential (FIG. 2b) and longitudinal (FIG. 2c) stresses generated within the materials present (in other words the materials of the support element and the composite), for a part made of composite material obtained by densification of a fibrous preform at a temperature situated between 900 and 1000° C., according to a known CVI method. In these FIGS. 2a to 2c, the curves 1 represent the calculations for a solid mandrel (rod) made of graphite, the curves 2 for a solid mandrel (rod) made of silica glass and the curves 3 for a hollow mandrel (tube) made of silica glass of 1 mm thickness.
Figure 2B:
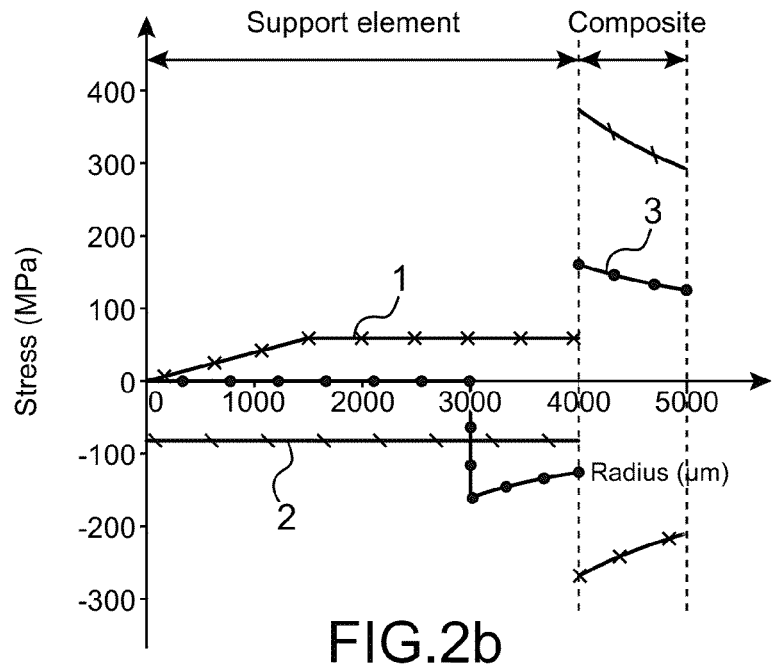
Figure 2C:
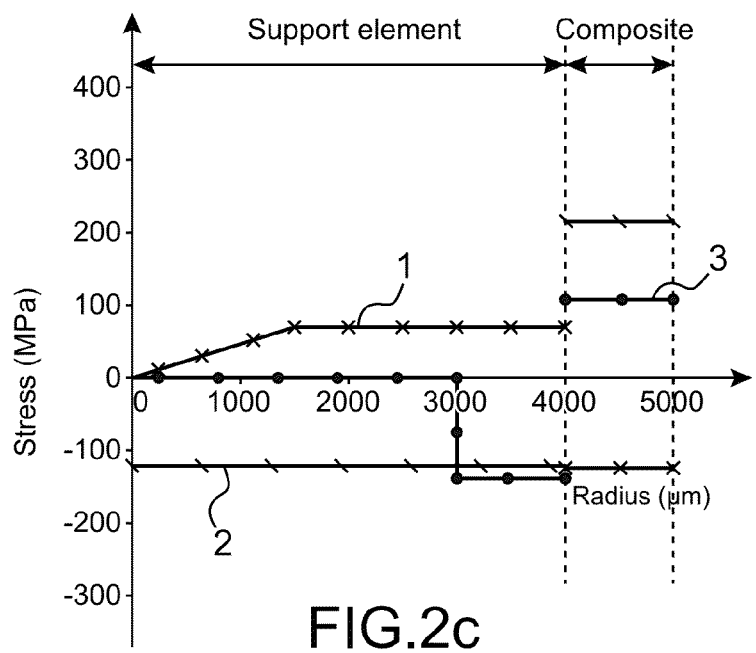

The results of the calculation of the residual tensile stresses along the directions (a) radial, (b) circumferential and (c) longitudinal on the radius (in micrometers) are presented in the form of graphs, in FIGS. 2a, 2b and 2c, respectively, for the three types of mandrels proposed.

In these FIGS. 2a to 2c, it may be very clearly observed that the use of a graphite rod (curve 1) only generates minimal stresses (below 70 Mpa) and/or compressive stresses (negative value stresses) within the composite, whereas the use of a silica glass rod (curve 2) generates high circumferential and longitudinal tensile stresses within the composite.

These high tensile stresses lead to a fissuring of the composite, or even its rupture, if the mandrel is conserved up to the end of the densification of the composite.

It will be noted that the passage to a hollow mandrel made of silica glass (tube) (curve 3) considerably reduces the residual stresses, compared to a solid silica glass mandrel (rod) (curve 2).

Figure 3:
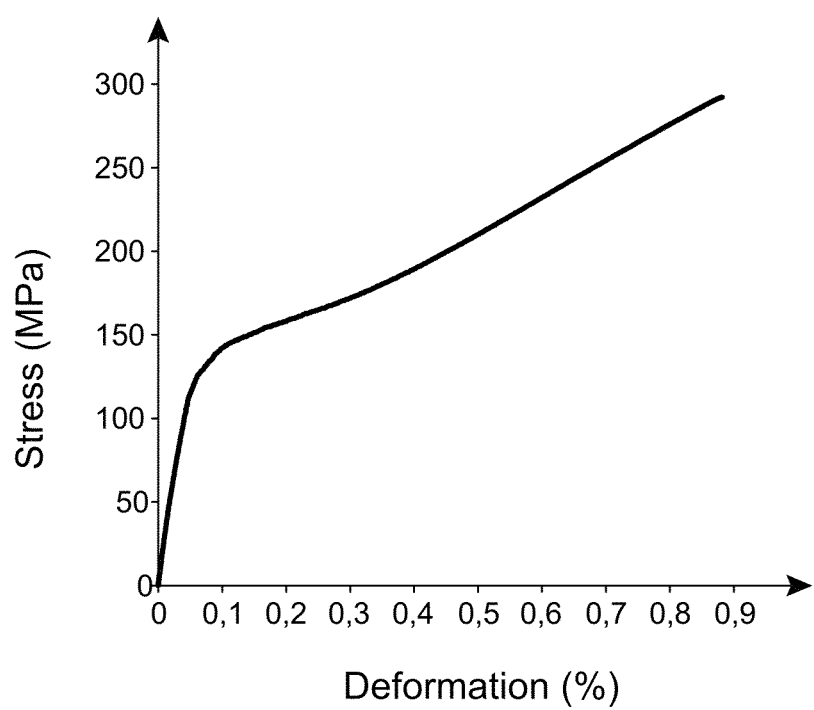
FIG. 3 represents a tensile curve of a part of tubular shape made of SiC/SiC composite material, having a fibrous preform obtained by 2D braiding and densified by a known method of CVI densification.

It will also be noted that, even in the case of the use of a mandrel of tubular shape, it is all the same necessary to remove said mandrel before the total densification of the composite. In fact, as may be noted by consulting the graph of FIG. 3, which represents the deformation observed as a function of the stress applied to a SiC/SiC composite tube obtained in the manner described above (same 2D braiding of the fibrous preform, same densification, same dimensions), such a tube has an elastic limit situated around 100 Mpa: it thus cannot withstand stresses above 100 MPa without fissuring.

Yet, tensile stresses above 100 MPa (in absolute value) may be observed in FIGS. 2*b* and 2*c*.

This is the reason why, according to the method of the invention, it is necessary to remove the mandrel before the quantity of infiltrated matrix is too high, in other words before the infiltrated matrix volume fraction is above 40%, preferentially before it is above 30%. Preferably, the infiltrated matrix volume fraction is around 10%.

The support element is removed by carrying out a selective chemical attack of the material of said support element. In the case of a silica glass support element, the support element may be easily eliminated by carrying out a chemical attack in a hydrofluoric acid (HF) bath at ambient temperature.

Once the support element is removed, the densification of the fibrous preform may be continued and completed in order to finalise the part made of composite material according to the desired properties.

Unlike the partial densification carried out to consolidate the preform, the densification carried out after the removal of the support element is no longer limited by the melting temperature of the support element, but only by the melting temperature of the fibres of the preform. Thus, all densification methods may be envisaged, even those requiring to implement temperatures above 1100° C. (corresponding to the melting temperature of silica glass), since the support element made of silica glass has been removed.

The invention claimed is:

1. A Method for producing a part made of ceramic material matrix and ceramic material fibres composite material, the method comprising the following successive steps:
    formation of a fibrous preform by intertwining threads constituted of ceramic material fibres on a contact surface of a support element reproducing the internal and/or external shape of the part to be produced;
    partial densification of the fibrous preform at a temperature below the melting temperature of the material of the support element and below the melting temperature of the material of the fibres of the preform, said partial densification resulting in a consolidated fibrous preform comprising a matrix volume fraction above 5% and at the most equal to 40% of the matrix volume of the part to be produced;
    removal of the support element from the consolidated fibrous preform by chemical attack of the contact surface of the material of the support element;
    densification of the consolidated preform, carried out at a temperature below the melting temperature of the fibres of said preform.

2. The method according to claim 1, wherein the fibrous preform consolidated at the partial densification step comprises a matrix volume fraction at the most equal to 30% of the matrix volume of the part to be produced.

3. The method according to claim 2, wherein the fibrous preform consolidated at the partial densification step comprises a matrix volume fraction at the most equal to 20% of the matrix volume of the part to be produced.

4. The method according to claim 3, wherein the fibrous preform consolidated at the partial densification step comprises a matrix volume fraction at the most equal to 10% of the matrix volume of the part to be produced.

5. The method according to claim 1, wherein the support element is made of silica, preferably made of silica glass.

6. The method according to claim 5, wherein the chemical attack of the support element is obtained using an acid, preferably hydrofluoric acid, or a base.

7. The method according to claim 1, wherein the support element is made of alumina.

8. The method according to claim 1, wherein the support element is made of zirconium oxide.

9. The method according to claim 1, wherein the support element comprises a core that is made of a metal able to withstand the densification temperature of the preform and which is covered with a layer of silica, silica glass, alumina or zirconium oxide.

10. The method according to claim 9, wherein the chemical attack of the support element is obtained by carrying out the chemical attack of the layer of silica, silica glass, alumina or zirconium oxide present on the core using an acid, preferably hydrofluoric acid, or a base.

11. The method according to claim 1, wherein the support element is a hollow element.

12. The method according to claim 1, wherein the support element has an axis of revolution or is of flat shape.

13. The method according to claim 1, wherein the fibres are made of a material selected from carbon and silicon carbide.

14. The method according to claim 1, wherein the matrix is made of a material selected from carbon and silicon carbide.

15. The method according to claim 1, wherein the part made of composite material is a composite material cladding for a gas cooled or sodium cooled fast reactor or for a pressurised water reactor.

16. The method according to claim 1, wherein the part made of composite material is a hexagonal composite material tube for a gas cooled or sodium cooled fast reactor or for a pressurised water reactor.

* * * * *